US009709461B2

(12) United States Patent
Lenferink et al.

(10) Patent No.: US 9,709,461 B2
(45) Date of Patent: Jul. 18, 2017

(54) METHOD OF INTEGRATING A TEMPERATURE SENSING ELEMENT

(71) Applicants: Joris Robert Jan Lenferink, Arnhem (NL); Jorke Jellema, Enschede (NL); Paulus Thomas Johannes Gennissen, Markelo (NL)

(72) Inventors: Joris Robert Jan Lenferink, Arnhem (NL); Jorke Jellema, Enschede (NL); Paulus Thomas Johannes Gennissen, Markelo (NL)

(73) Assignee: Sensata Technologies, Inc., Attleboro, MA (US)

( * ) Notice: Subject to any disclaimer, the term of this patent is extended or adjusted under 35 U.S.C. 154(b) by 602 days.

(21) Appl. No.: 13/690,119

(22) Filed: Nov. 30, 2012

(65) Prior Publication Data

US 2014/0150540 A1  Jun. 5, 2014

(51) Int. Cl.
*G01K 7/00* (2006.01)
*G01K 1/14* (2006.01)
*G01K 13/00* (2006.01)
*G01M 15/00* (2006.01)
*G01K 13/02* (2006.01)

(52) U.S. Cl.
CPC .............. *G01M 15/00* (2013.01); *G01K 1/14* (2013.01); *G01K 13/02* (2013.01); *G01K 2013/024* (2013.01)

(58) Field of Classification Search
CPC ...... G01K 13/00; G01K 2205/04; G01K 7/00; G01K 1/14; G01N 33/0004
USPC ....... 374/141, 143, 144, 163, 185, 208, 184, 374/179, 100
See application file for complete search history.

(56) References Cited

U.S. PATENT DOCUMENTS

| 4,955,380 | A | * | 9/1990 | Edell ..................... A61B 5/1473 204/403.01 |
| 5,193,912 | A | * | 3/1993 | Saunders ................. G01K 1/14 136/232 |
| 6,003,379 | A | * | 12/1999 | Ichikawa et al. ................ 73/708 |
| 6,412,977 | B1 | * | 7/2002 | Black ...................... G01K 1/024 323/315 |
| 6,625,029 | B2 | * | 9/2003 | Bernini ......................... 361/728 |
| 6,701,790 | B2 | * | 3/2004 | Fortner et al. ................... 73/703 |
| 6,746,150 | B2 | * | 6/2004 | Wienand ................ G01K 13/02 374/148 |
| 7,467,891 | B2 | * | 12/2008 | Gennissen ............. G01K 13/02 374/141 |
| 7,568,835 | B2 | * | 8/2009 | Pils ......................... G01K 5/326 374/143 |
| 7,597,668 | B2 | * | 10/2009 | Yarden ................... G01K 1/165 374/102 |

(Continued)

FOREIGN PATENT DOCUMENTS

| EP | 350612 B1 | * | 9/1993 |
| EP | 893676 A2 | * | 1/1999 |
| WO | WO 2004066194 A1 | * | 8/2004 |

*Primary Examiner* — Gail Kaplan Verbitsky
(74) *Attorney, Agent, or Firm* — Burns & Levinson LLP; George N. Chaclas; Daniel McGrath

(57) ABSTRACT

A multi-function sensor includes a body that includes a sensing circuit disposed on a substrate, the sensing circuit including a pressure sensor and a temperature sensor, the temperature sensor being disposed on a flexible portion of the substrate. A method of fabrication and additional embodiments are disclosed.

9 Claims, 7 Drawing Sheets

(56) References Cited

U.S. PATENT DOCUMENTS

| | | | | |
|---|---|---|---|---|
| 7,938,783 B2* | 5/2011 | Fraden | ...................... | A61B 5/01 600/549 |
| 8,192,078 B2* | 6/2012 | Gebauer | ................ | G01D 11/24 374/143 |
| 8,523,432 B2* | 9/2013 | Mujumdar | ............... | G01K 1/14 374/141 |
| 2002/0071475 A1* | 6/2002 | Betzner | .................... | G01K 7/22 374/185 |
| 2007/0071065 A1* | 3/2007 | Pils | ........................ | G01K 5/326 374/163 |
| 2007/0110124 A1* | 5/2007 | Shiraki | .................... | G01K 1/08 374/208 |
| 2007/0203650 A1* | 8/2007 | Jensen et al. | ...................... | 702/3 |
| 2007/0237205 A1* | 10/2007 | Hayashi | ........................ | 374/163 |
| 2008/0083283 A1* | 4/2008 | Takeuchi et al. | ................ | 73/715 |
| 2008/0112462 A1* | 5/2008 | Sisk | ........................ | G01K 1/14 374/163 |
| 2008/0219319 A1* | 9/2008 | Buckalew | .................... | 374/178 |
| 2009/0080492 A1* | 3/2009 | Takeuchi | ................. | G01K 1/14 374/144 |
| 2011/0019373 A1* | 1/2011 | Ryhanen et al. | .............. | 361/760 |
| 2011/0019714 A1* | 1/2011 | Perry | ................. | B29C 45/14639 374/183 |
| 2011/0032971 A1* | 2/2011 | Reiter | ...................... | G01K 1/12 374/208 |
| 2013/0201230 A1* | 8/2013 | Sugahara | ................. | B41J 29/38 347/6 |
| 2013/0317388 A1* | 11/2013 | Bieberich | ............. | G01K 1/165 600/549 |
| 2014/0341255 A1* | 11/2014 | Kaiser | .................... | G01K 13/02 374/143 |
| 2015/0192478 A1* | 7/2015 | Rueth | ...................... | G01L 9/00 374/143 |
| 2015/0204733 A1* | 7/2015 | Newell | .................... | G01K 1/14 374/141 |

\* cited by examiner

METHOD OF INTEGRATING A TEMPERATURE SENSING ELEMENT

BACKGROUND OF THE INVENTION

1. Field of the Invention

The invention disclosed herein relates to a temperature sensor, and in particular, to a combined temperature and pressure sensor that may be mounted onto a variety of apparatus for sensing temperature and pressure.

2. Description of the Related Art

A variety of industrial processes call for knowledge of ambient temperature and pressure conditions. For example, in automotive systems, it is desirable to know pressure and temperature of gasses so that combustion may be more efficiently controlled. A number of sensors have been devised to address this need.

Generally, these sensors provide for monitoring of at least one of temperature and pressure on an ongoing basis. In some embodiments, the sensors are adapted for harsh environments. As one might surmise, some of these sensors are complicated (and therefore costly) devices.

Consider for example, U.S. Pat. No. 8,038,345, entitled "Sensor plug for combined pressure and temperature measurement," which issued on Oct. 18, 2011 to Stoll et al. This patent discloses a sensor plug for pressure and temperature measurement of a fluid medium. The sensor plug includes a sensor body having a sensor body axis, as well as a pressure sensor disposed substantially concentrically on the sensor body axis. Also provided in the sensor body is a through orifice for connecting the pressure sensor to the fluid medium, and a temperature sensing element orifice having a temperature sensing element received therein. The temperature sensing element orifice has a temperature sensing element orifice axis that is inclined with respect to the sensor body axis in such a way that at its end pointing toward the fluid medium, it is inclined toward the sensor body axis.

Unfortunately, this device is relatively complicated to assemble. For example, a laser welding process is used "which must meet stringent requirements." Accordingly, it is anticipated that assembly is costly, time consuming, and may result in a number of defective units.

Consider another device described in U.S. Pat. No. 7,467,891, entitled "Sensor arrangement for measuring a pressure and a temperature in a fluid," which issued on Dec. 23, 2008 to Gennissen, et al. This patent discloses a sensor arrangement for measuring a pressure and a temperature in a fluid. The sensor arrangement includes a temperature sensitive electrical element and a pressure sensing electrical element, the temperature sensitive electrical element and pressure sensing electrical element are both coupled to one side of a metallic membrane structure.

Similar to the sensor plug of Stoll et al., the sensor arrangement of Gennissen, et al. includes multiple and separate sensing elements, and may therefore be complicated to assemble.

Given that sensors are often used in large quantities, such as in mass-produced automobiles, it is desirable to have a robust sensor that may be easily and reliably manufactured. Thus, what is needed is a design for a sensor that provides for simple, cost effective manufacture and results in reliable performance.

SUMMARY OF THE INVENTION

In one embodiment, a multi-function sensor is disclosed. The multi-function sensor includes a body that includes a sensing circuit disposed on a substrate, the sensing circuit including a pressure sensor and a temperature sensor, the temperature sensor being disposed on a flexible portion of the substrate.

In another embodiment, a method for fabricating a multi-function sensor is provided. The method includes selecting a sensing circuit at least partially disposed on a flexible substrate, mounting the sensing circuit into a body, flexing a portion of the substrate to orient at least one sensor; and capping the body and sensing circuit to provide the multi-function sensor.

In yet another embodiment, a temperature and pressure sensor is provided. The temperature and pressure sensor includes a body that includes a unitary sensing circuit disposed on a flexible substrate, the sensing circuit having a pressure sensor and a temperature sensor, wherein the pressure sensor is bonded to a carrier disposed between the pressure sensor and the substrate, such that the pressure sensor is oriented for being exposed to a volume for receiving a sampling environment; and the temperature sensor is oriented for protruding into the sampling environment.

DETAILED DESCRIPTION OF THE INVENTION

Disclosed herein is a multi-function sensor. In the exemplary embodiment, the multi-function sensor is configured for sensing temperature and pressure. The multi-function sensor includes a sensing circuit that provides for efficient manufacturing. The sensing circuit may be disposed on a substrate that is at least partially flexible. In some embodiments, the sensing circuit is disposed on a unitary, flexible substrate. Generally, the multi-function sensor is adapted for industrial use, such as in settings where a long useful life in a harsh environment is required.

Figure 1:
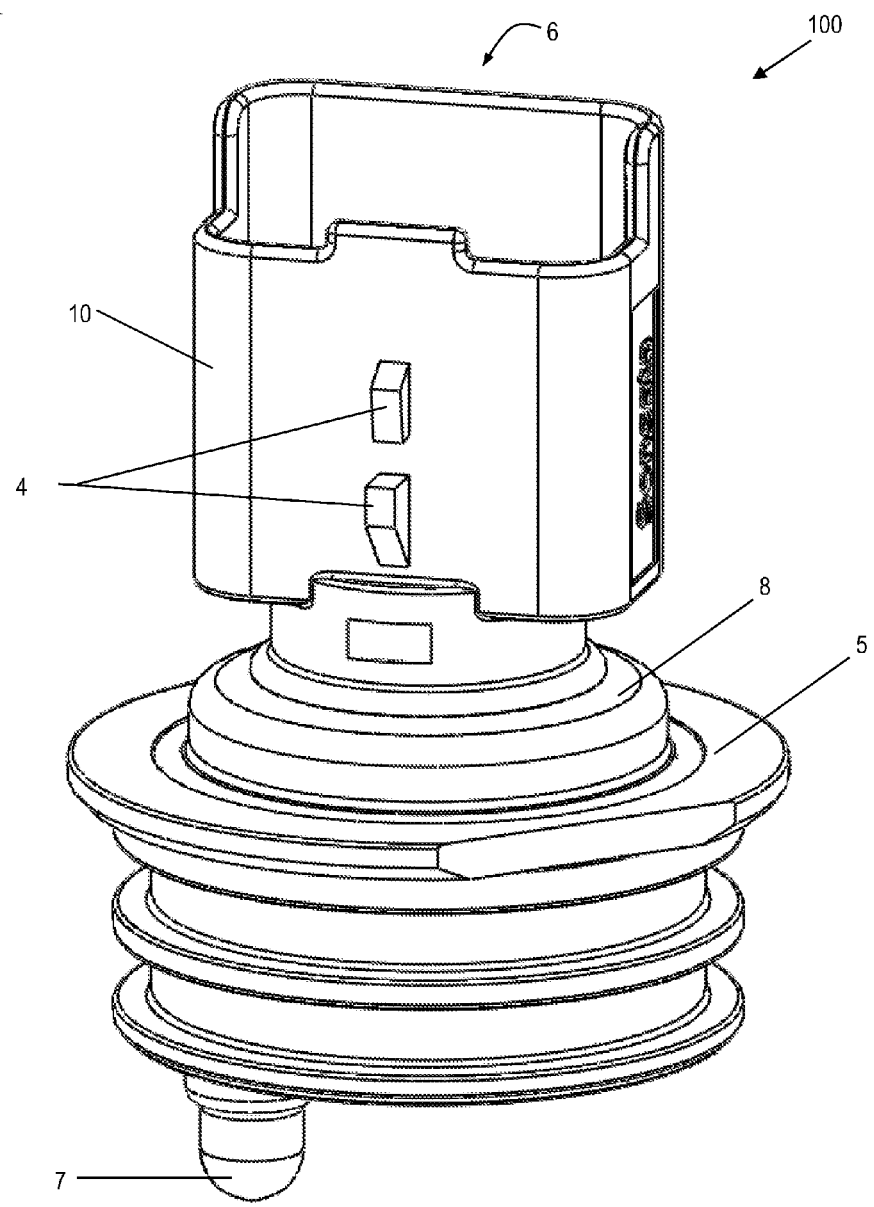
FIG. 1 is a perspective view of an embodiment of a multi-function sensor.

Referring now to FIG. 1, there is shown a perspective view of an exemplary multi-function sensor 100. In this example, the multi-function sensor 100 includes a body 10, a portion of which is referred to as a sensing head 8. The body 10 includes an electrical port 6 for joining with an external connector (not shown). The external connector may also be joined with exemplary mounting features 4 that are at least one of disposed upon and disposed within the body 10. Joining of an external connector that is configured to cooperate with the mounting features 4 may be relied upon to provide for robust coupling (for example, latching) of electrical components within the electrical port 6 and the respective external connector.

The body 10 and the sensing head 8 (as well as some other components of the sensor 100) may be formed of, for example, suitable plastic, such as polyvinyl chloride (PVC), acrylonitrile butadiene styrene (ABS) and other similar materials. Other materials may be used as deemed appropriate. One example of another material is a ceramic material. Generally, material in the body 10 and the sensing head 8 exhibit robust physical strength as well as suitable dielectric properties over a wide range of temperatures and pressures. Techniques for fabrication of multi-function sensor 100 include conventional techniques such as injection molding.

The sensing head 8 may be at least partially surrounded by a protective cap 5. In general, in operation, the protective cap 5 will be immersed in or exposed to a sampling environment for ascertaining at least one of the environmental temperature and the environmental pressure. Quite often, the sampling environment will be harsh. For example, aside from exhibiting high temperatures and high pressures, the sampling environment may be acidic, corrosive or present other conditions leading to degradation of the multi-function sensor 100. Accordingly, the protective cap 5 may be fabricated from materials suited for protecting the multi-function sensor 100 from the sampling environment.

The protective cap 5 may include at least one protrusion 7. Generally, the protrusion 7 includes there within at least one temperature sensor, while providing for physical protection of the temperature sensor from the sampling environment. The protective cap 5 may also include O-rings or other similar adornments to provide, for example, efficient sealing of the multi-function sensor 100.

Figure 2:
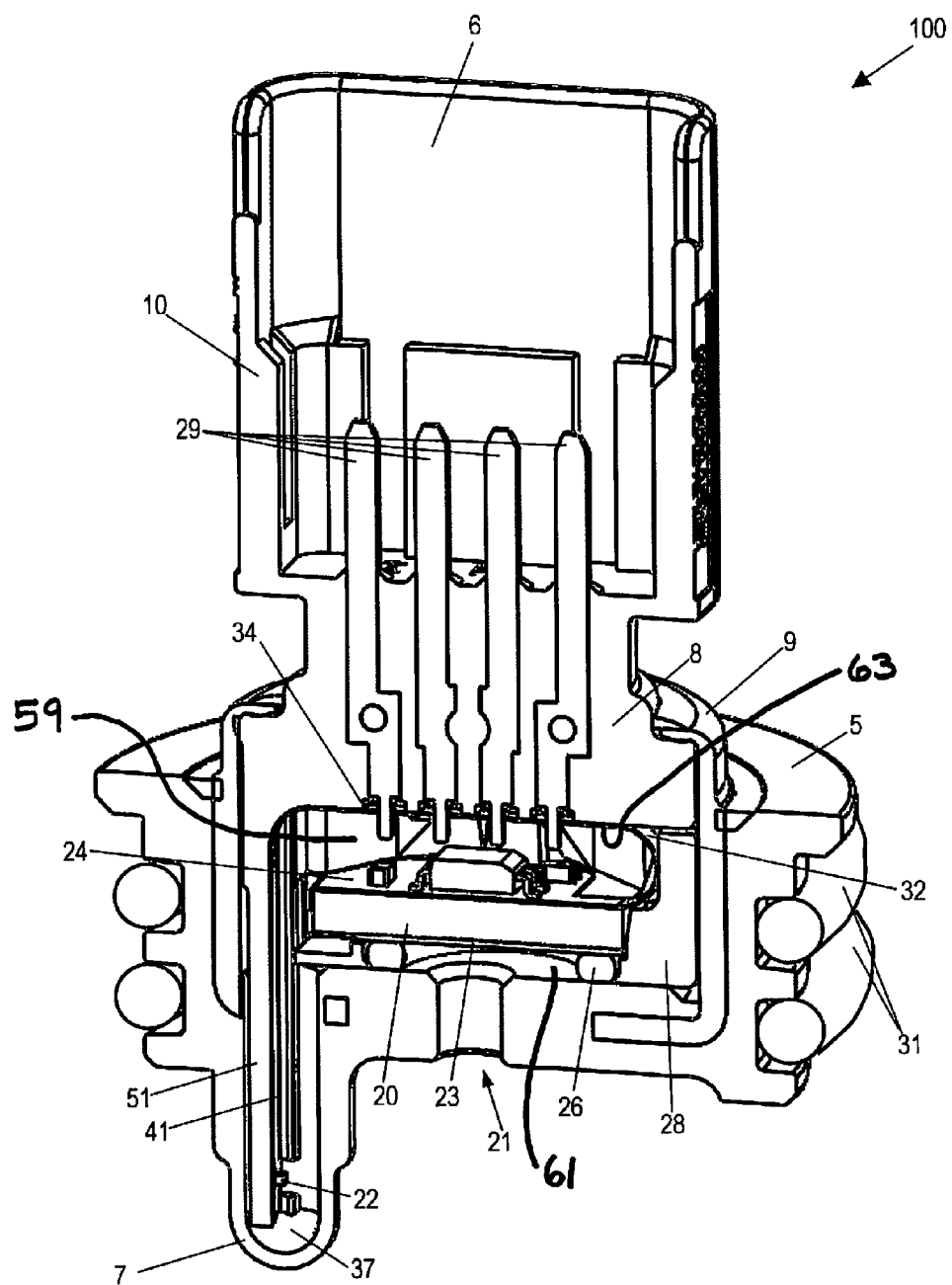
FIG. 2 is a cut-away perspective view of the sensor of FIG. 1.

Referring now to FIG. 2, there is shown a cutaway side view of the multi-function sensor 100. Starting from the top of the diagram, it may be seen that the electrical port 6 includes at least one conductor 29. The at least one conductor 29 is generally disposed through the sensing head 8 and coupled to a sensing circuit 20. The sensing head 8 may be protected by a housing 9 that at least partially surrounds the sensing head 8.

The sensing circuit 20, which is discussed in greater detail with reference to FIG. 3, may be disposed over an inner seal ring 26. The inner seal ring 26 provides a pressure boundary to a volume that is exposed to a pressure annulus 21. The pressure annulus 21 is, in turn, exposed to the sampling environment. Thus, pressure transients in the sampling environment are communicated to a pressure sensor 23 that is a part of the sensing circuit 20.

The sensing circuit 20 may be retained in place relative to the sensing head 8 with the addition of a lid 28. The lid 28 at least partially surrounds the sensing circuit 20 as well as the inner seal ring 26. The lid 28, in turn, is generally retained over the sensing head 8 by the housing 9, which is then covered with the protective cap 5. As shown in this illustration, the protective cap 5 may include at least one O-ring 31.

The pressure annulus 21 is realized when a combination of the lid 28, the housing 9 (as appropriate) and the protective cap 5 are installed over the sensing head 8.

In some embodiments, the lid 28 and the housing 9 are integrated into a single unitary structure. In other embodiments, at least one of the lid 28 and the housing 9 are multi-part structures. At least one of the lid 28 and the housing 9 may be assembled using conventional techniques, such as force-fitting, gluing, snap-fitting, installation of an additional retainer and the like.

Refer now to the area that includes the protrusion 7. It may be seen that the body extends downwardly to provide an open sleeve 51 (shown in more detail in FIG. 5). That is, at least a portion of a length of the sleeve 51 may be open such that a temperature arm 41 may be laterally inserted therein. The temperature arm 41, which is a part of the sensing circuit 20, includes disposed near a distal end of the temperature art 41, at least one temperature sensor 22. Generally, the at least one temperature sensor 22 is disposed within a suitable gel or other material which is designed to communicate temperature from the protrusion area of the protective cap 5 to the temperature sensor 22. Additional features (specifically, supporting electronics 24, a return 32, and a connector section 34) are shown in greater detail in FIG. 3.

Figure 3:
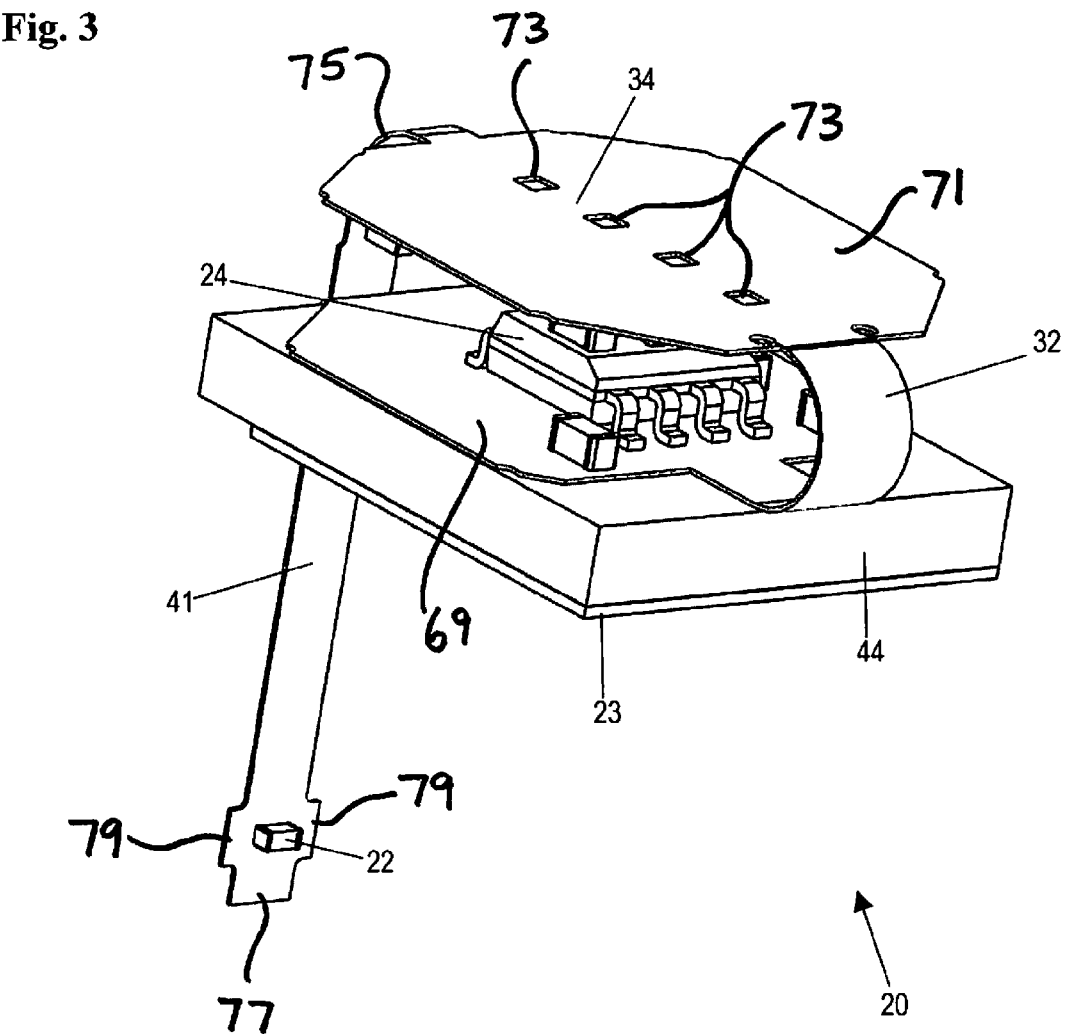
FIG. 3 is a perspective view of a sensing circuit that may be incorporated into the sensor of FIG. 1.

Refer now also to FIG. 3 where the sensing circuit 20 is depicted in a geometry that is equivalent to an installed geometry. However, in this illustration, the sensing circuit 20 is shown separated from the body 10. In this embodiment, the sensing circuit 20 is mounted upon a circuit board that is at least partially flexible. A carrier 44 may be included and used to provide a base to supporting electronics 24. In this example, the pressure sensor 23 is a capacitive sensing element that is mounted onto a side of the carrier 44 that is opposite to the supporting electronics 24. The carrier 44 may include at least one via (not shown) for passage of conductors that are configured to conduct signals from the pressure sensor 23 to the supporting electronics 24. Each of the pressure sensor 23 and the portion of the sensing circuit 20 that provides the supporting electronics 24 may be affixed to the carrier 44 by way of, for example, suitable adhesive, such as an epoxy paste. The carrier 44 may be fabricated from a suitable material, such as a ceramic or high temperature polymer (such as a polyimide). The carrier 44 may be provided as a laminar material, such as a substrate for a high-temperature circuit board.

The return 32 is a flexible portion of the circuit board and includes conductors that conduct signals from the supporting electronics 24 to the connector section 34. The connector section 34 includes suitable connection features for connecting with the at least one conductor 29. Opposite to the return 32 and also in communication with the connector section 34, is the temperature arm 41. The temperature arm 41 extends a suitable length such that the temperature sensor 22 mounted thereon will be appropriately disposed within the protrusion 7 when assembled in final form.

Figure 4:
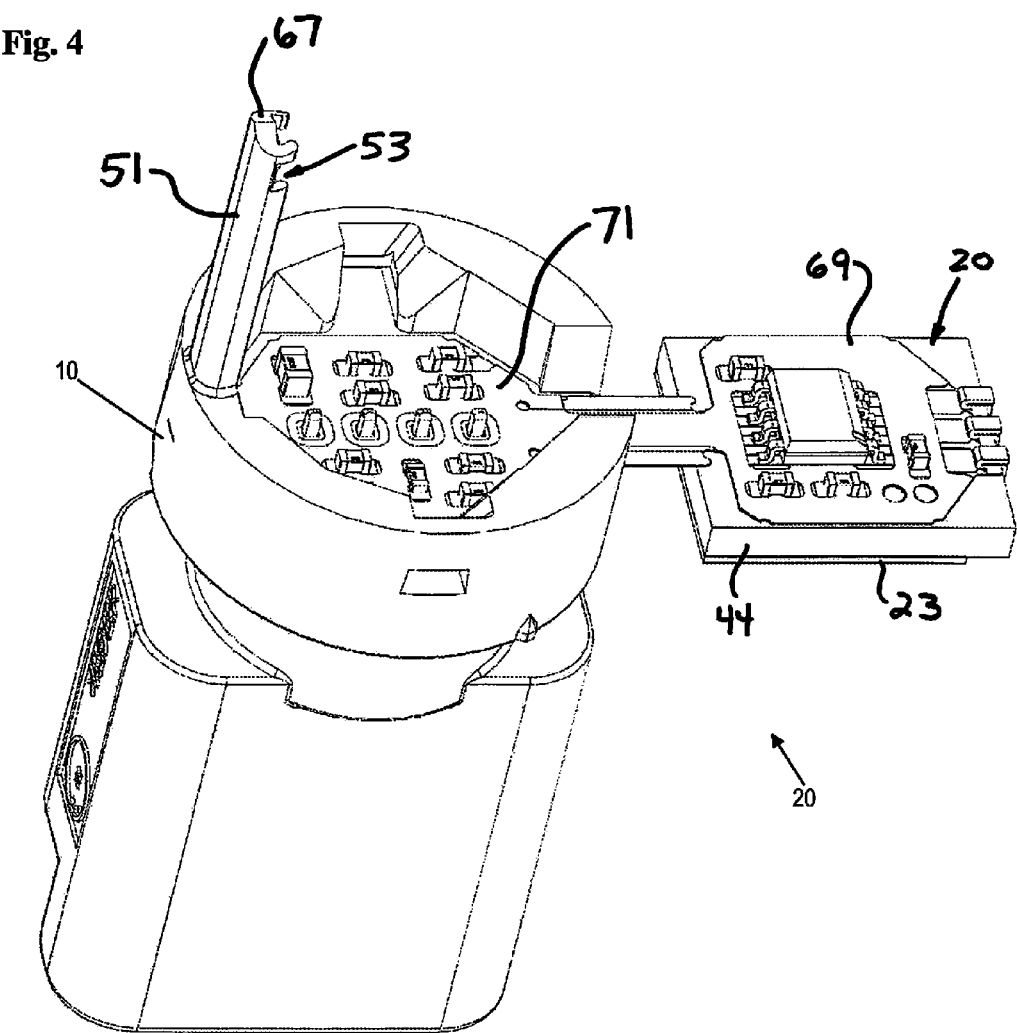
FIG. 4 is a perspective view of the sensing circuit of FIG. 3 disposed within a body during assembly of the sensor of FIG. 1.
Figure 5:
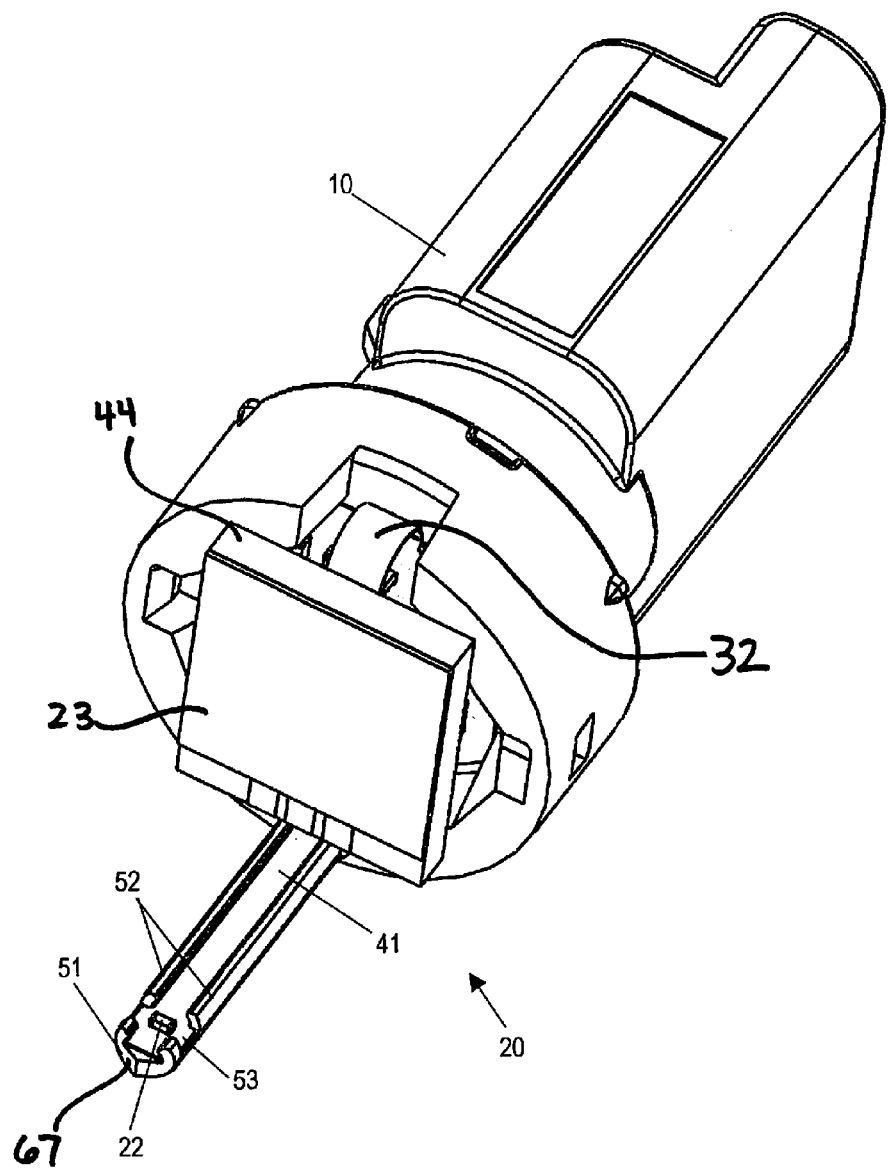
FIG. 5 is a perspective view of the sensing circuit in a final configuration prior to installation of a lid.

Referring now to FIG. 4, there is shown a perspective view of the sensing circuit 20 disposed in the body 10. FIG. 5 depicts the sensing circuit 20 installed in the body 10.

Installation of the sensing circuit 20 into the body 10 may be accomplished manually (by hand) or by way of, for example, a specialized tool (not shown). In one example, adhesive is applied to a portion of the body 10 that surround the at least one connector 29. Subsequently, the connector section 34 of the sensing circuit 20 is placed onto adhesive. The specialized tool will then press fit the temperature arm 41 into the open sleeve 51.

More specifically, and as one example, as shown in FIG. 5, the sleeve 51 may include ridges 52 disposed thereon. The ridges 52 may be included such that the temperature arm 41 portion of the sensing circuit 20 may be tucked under the ridges 52 and therefore retained in the sleeve 51. In one example, the tool provides lateral compression of the temperature arm 41 such that a width profile of the temperature arm 41 is reduced. Once the width profile of the temperature arm 41 is adequately reduced, the temperature arm 41 may be laterally inserted into the open sleeve 51. The temperature arm 41 is then permitted to relax, at which point the ridges 52 will retain side portions of the temperature arm 41 in place.

It may be noted that the ridges 52 may be discontinuous and therefore include at least one gap 53. The at least one gap 53 may be included to assist in maintaining proper positioning of the temperature sensor 22, among other things.

Once assembled into the configuration illustrated in FIG. 5, the lid 28 (and housing 9, as appropriate) is disposed over the sensing circuit 20 and the body 10.

Figure 6:
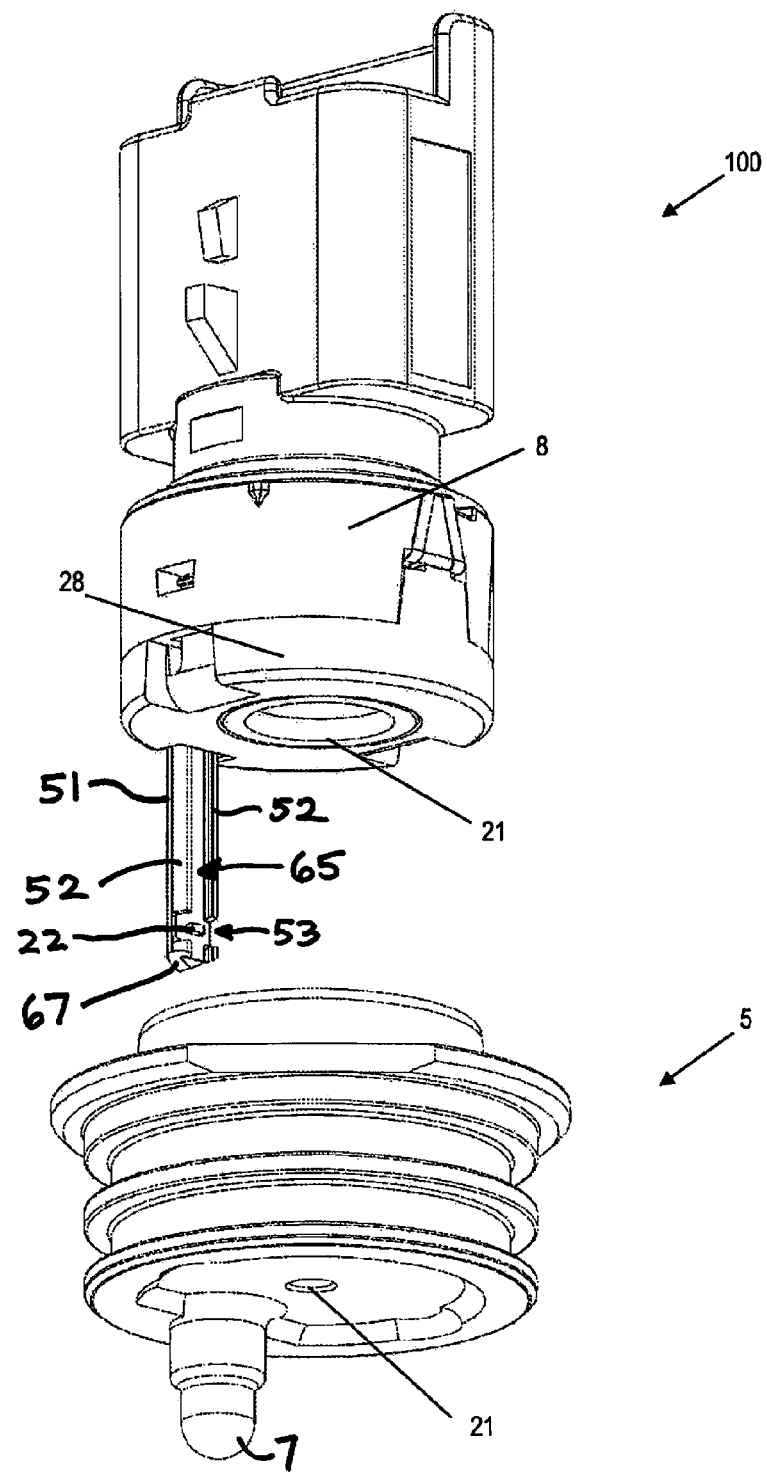
FIG. 6 depicts mating components to provide the sensor of FIG. 1.

Referring to FIG. 6, the resulting multi-function sensor 100 may then be inserted into the protective cap 5. The thermal conductive paste used to provide for thermal communication between the protrusion 7 of the protective cap 5 and the temperature sensor 22 may be loaded into the protrusion 7, and additionally onto the sleeve 51 and arm 41 prior to insertion. Accordingly, when the multi-function sensor 100 is inserted into the protective cap 5, the temperature sensor 22 will be immersed in the thermal conductive paste.

Figure 7:
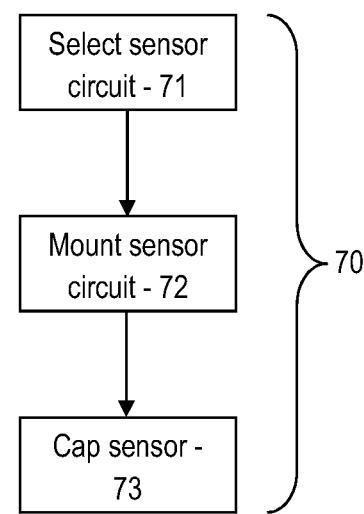
FIG. 7 is a flow chart providing an exemplary method for fabricating the sensor of FIG. 1.

Referring to FIG. 7, there is shown an exemplary method for assembly 70 of the multi-function sensor 100. In this example, a first step calls for selecting the sensing circuit 20. The sensing circuit 20 selected may include any one or more of a variety of types of sensors. A second step calls for mounting the sensing circuit 71. A third step calls for capping the sensor 73. Capping the sensor 73 may include, for example, installation of the lid 28, the housing 9 as well as the protective cap 5.

Having thus disclosed an exemplary embodiment, certain additional aspects are provided.

It should be understood that the multi-function sensor 100 may be used in a variety of sensing applications. That is, the multi-function sensor 100 may be configured for sensing over a particular temperature or pressure range. In some embodiments, the pressure sensor and the temperature sensor are each configured to sense conditions as would be encountered during operation of an internal combustion engine, a gas turbine, and other similar component.

Generally, the multi-function sensor 100 is fabricated from conventional materials and components. For example, a variety of plastics, ceramics and metals may be used. The sensing circuit 20 may be entirely of, or only partially of, a flexible circuit. Accordingly, the sensing circuit 20 may be fabricated in various pieces and subsequently assembled prior to installation in the body 10, or the sensing circuit 20 may be a unitary sensing circuit 20. The body 10 may be of any shape and size deemed suitable by at least one of a designer, user, manufacturer and other similarly interested party.

Due to the simplicity of the sensing circuit 20 from a manufacturing standpoint, assembly of the multi-function sensor 100 may be accomplished with high-throughput and high reliability. This permits advanced assembly of the sensing circuit 20 and provides for simple adaptations and improvements to the multi-function sensor 100. Further, by separately assembling the sensing circuit 20 in its entirety, the body 10 is not subjected to detrimental temperatures and materials as may be needed for soldering.

In some embodiments, the temperature sensor 22 is a surface mount device (SMD) thermistor. However, the temperature sensor 22 may include any technology that is deemed suitable (for example, a thermocouple). The pressure sensor 23 may measure absolute pressure and/or gage pressure. In some embodiments, the pressure sensor 23 includes a capacitive sensing element. In these embodiments, deflection of at least a portion of the capacitive element (due to pressure exerted thereon) results in a change to an output signal from the element. The change in the output signal can be correlated to the exerted pressure.

Referring again to FIGS. 2-6, the multi-function sensor 100 can include a body 8 at least partially defining a cavity 59 with an annulus 21 for providing fluidic communication to a first side of the cavity 59 and an electrical port 6 for providing electrical connections on a second side 61 of the cavity 59. A sleeve 51 extends from the body 8 to a distal end 67. The sleeve 51 has opposing ridges 52 that define a channel 65 therebetween. The distal end 67 defines a gap 53. The sensing circuit 20 may include: a first planar portion 69 in the cavity 59; a second planar portion 71, in the cavity 59, defining a connector section 34 with conductor apertures 73 for receiving conductors 29 passed through the electrical port 6; a first flexible return 32 for providing electrical connections between the first planar portion 69 and the connector section 34; a second flexible return 75 extending from the first planar portion 69; and an arm 41 extending out of the cavity 59 from the second flexible return 75 into the channel 65, the arm also having opposing locking features 79 on an arm distal end 77 thereof. The pressure sensor 23 is mounted on the first planar portion 69. The temperature sensor 22 is mounted on the arm distal end 77, wherein: the arm 41 and the second flexible return 75 electrically connect the temperature sensor 22 to the connector section 34 so that the conductors 29 electrically couple to both the pressure and temperature sensors 23, 22 in the connector section 34; and the locking features 79 engage in the gap 53 to accurately fix the temperature sensor in a desired position. The electronics can be mounted on the first planar portion and a carrier 44 between the pressure sensor and the first planar portion for supporting the electronics. The body 8 is preferably disc-shaped and further comprising a lid 28 that snap fits into the body 8 to fix and retain the sensing circuit 20 in position.

The multi-function sensor 100 can also be configured to have a body 8 having a depending sleeve 51, the sleeve having opposing ridges 52 that define a channel 65 therebetween with a gap 53 formed in the opposing ridges at a distal end 67 of the sleeve. The sensing circuit 20 may include: a first portion 69; an elongated planar arm 41 extending from the first portion 69 and having opposing lateral extensions 79. The pressure sensor 23 is mounted on the first portion 69 in a particular orientation with respect to the opposing lateral extensions 79. The temperature sensor 22 is mounted on a distal end 77 of the planar arm, wherein the planar arm 41 extends through the channel 65 and the lateral extensions 79 engage in the gap 53 to accurately fix the temperature sensor in a desired position. The cap can couple to the body and, thereby, enclose the sensing circuit, the cap defining a protrusion 7 into which the sleeve 51 and elongated planar arm extend.

It should be recognized that the teachings herein are merely illustrative and are not limiting of the invention. Further, one skilled in the art will recognize that additional components, configurations, arrangements and the like may be realized while remaining within the scope of this invention. For example, configurations of sensors, circuitry, caps and the like may be varied from embodiments disclosed herein. Generally, design and/or application of components of the multi-function sensor is limited only by the needs of a system designer, manufacturer, operator and/or user and demands presented in any particular situation.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

In the present application a variety of variables are described, including but not limited to components, conditions, and performance characteristics. It is to be understood that any combination of any of these variables can define an embodiment of the invention. For example, a combination of a particular material for the body, with a set of sensors, under a particular range of a given environmental condition, but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multi-function sensor comprising:
   a body having a sensing head portion, the body including an electrical port having at least one conductor and an elongated sleeve defining a distal gap;
   the at least one conductor generally disposed through the sensing head portion and coupled to a sensing circuit;
   the sensing head portion of the body at least partially surrounded by a protective cap that includes one or more O-rings and at least one protrusion, the protrusion enclosing at least one temperature sensor;
   the sensing circuit and the at least one temperature sensor being mounted upon a circuit board that is at least partially flexible;
   a carrier to provide a base to the sensing circuit; and
   a pressure sensor mounted to the carrier and in electrical communication with the sensing circuit so that by connecting to the circuit board, signals from the at least one temperature sensor and the pressure sensor are accessed,
   wherein the circuit board forms an arm that extends within the protrusion, the arm having a distal end with the at least one temperature sensor thereon and a locking feature for engaging with the distal gap for setting a position of the at least one temperature sensor when the sleeve and temperature arm are in the protrusion.

2. The multi-function sensor of claim 1 wherein the pressure sensor is a capacitive sensing element that is mounted onto a side of the carrier that is opposite to the sensing circuit.

3. The multi-function sensor of claim 1 wherein the carrier includes at least one via for passage of conductors that are configured to conduct signals from the pressure sensor sensing circuit to the pressure sensor.

4. The multi-function sensor of claim 1 wherein the at least one temperature sensor is disposed within a gel designed to communicate temperature from the protrusion area of the protective cap to the temperature sensor.

5. A multi-function sensor comprising:
   a body at least partially defining a cavity with an annulus for providing fluidic communication to a first side of the cavity and an electrical port for providing electrical connections on a second side of the cavity;
   a sleeve extending from the body to a distal end, the sleeve having opposing ridges that define a channel therebetween, the distal end defining a gap;
   a sensing circuit including: a first planar portion in the cavity; a second planar portion, in the cavity, defining a connector section with conductor apertures for receiving conductors passed through the electrical port; a first flexible return for providing electrical connections between the first planar portion and the connector section; a second flexible return extending from the first planar portion; and an arm extending out of the cavity from the second flexible return into the channel, the arm also having opposing locking features on an arm distal end thereof;
   a pressure sensor mounted on the first planar portion; and
   a temperature sensor mounted on the arm distal end, wherein: the arm and the second flexible return electrically connect the temperature sensor to the connector section so that the conductors electrically couple to both the pressure and temperature sensors in the connector section; and the locking features engage in the gap to accurately fix the temperature sensor in a desired position.

6. The multi-function sensor of claim 5, further comprising electronics mounted on the first planar portion and a carrier between the pressure sensor and the first planar portion for supporting the electronics.

7. The multi-function sensor of claim 5, wherein the body is disc-shaped and further comprising a lid that snap fits into the body to fix and retain the sensing circuit in position.

8. A multi-function sensor comprising:
   a body having a depending sleeve, the sleeve having opposing ridges that define a channel therebetween with a gap formed in the opposing ridges at a distal end of the sleeve;
   a sensing circuit including: a first portion; and an elongated planar arm extending from the first portion and having opposing lateral extensions;
   a pressure sensor mounted on the first portion in a particular orientation with respect to the opposing lateral extensions; and
   a temperature sensor mounted on a distal end of the planar arm, wherein the planar arm extends through the channel and the lateral extensions engage in the gap to accurately fix the temperature sensor in a desired position.

9. The multi-function sensor of claim 8, further comprising a cap for coupling to the body and, thereby, enclosing the sensing circuit, the cap defining a protrusion into which the sleeve and elongated planar arm extend.

* * * * *